United States Patent [19]

Bernstein et al.

[11] 4,063,799
[45] Dec. 20, 1977

[54] PHOTOGRAPHIC IMAGING

[75] Inventors: Kenneth L. Bernstein, Framingham; Philip S. Considine, Woburn; George B. Parrent, Jr., Carlisle, all of Mass.

[73] Assignee: Technical Operations, Incorporated, Boston, Mass.

[21] Appl. No.: 505,312

[22] Filed: Oct. 23, 1965

[51] Int. Cl.² .......................... G02B 5/18; G09C 1/00
[52] U.S. Cl. ..................................... 350/162 SF; 35/2
[58] Field of Search ........................... 350/162 SF, 3.5; 340/146.3 F, 146.3 P, 146.3 Z; 354/122; 250/199; 35/2

[56] References Cited

U.S. PATENT DOCUMENTS 3,156,051  11/1964  Hughes et al. .................. 340/347 P

OTHER PUBLICATIONS

Leith et al.: Journal of the Optical Society of America, vol. 52, No. 10, Oct. 1962, pp. 1123-1130.
Lohmann: "Optical Analog Computer" IBM Technical Disclosure Bulletin, vol. 6, No. 10, Mar. 1964, pp. 56, 57.

Primary Examiner—S. C. Buczinski
Attorney, Agent, or Firm—Alfred H. Rosen

[57] ABSTRACT

This disclosure depicts an optical system and method for encoded storage and retrieval, wherein record images are enciphered using incoherent light and wherein deciphering of the coded images is performed in coherent light. More particularly, the disclosure depicts encoding images by inserting a complex phase function in the Fourier transform plane of the imaging means which satisfies the relation:

$$\Phi(x, y) = \Phi(-x, -y).$$

To retrieve a decoded image of the original object, the encoded record is illuminated with collimated coherent quasi-monochromatic light and its Fourier transform is formed in a plane in space. A complex phase function equal to the autoconvolution of the coding function is located in the transform plane. The phase-altered distribution in the transform plane is retransformed to produce a decoded image. Exemplary coding and decoding phase function is also depicted.

3 Claims, 7 Drawing Figures

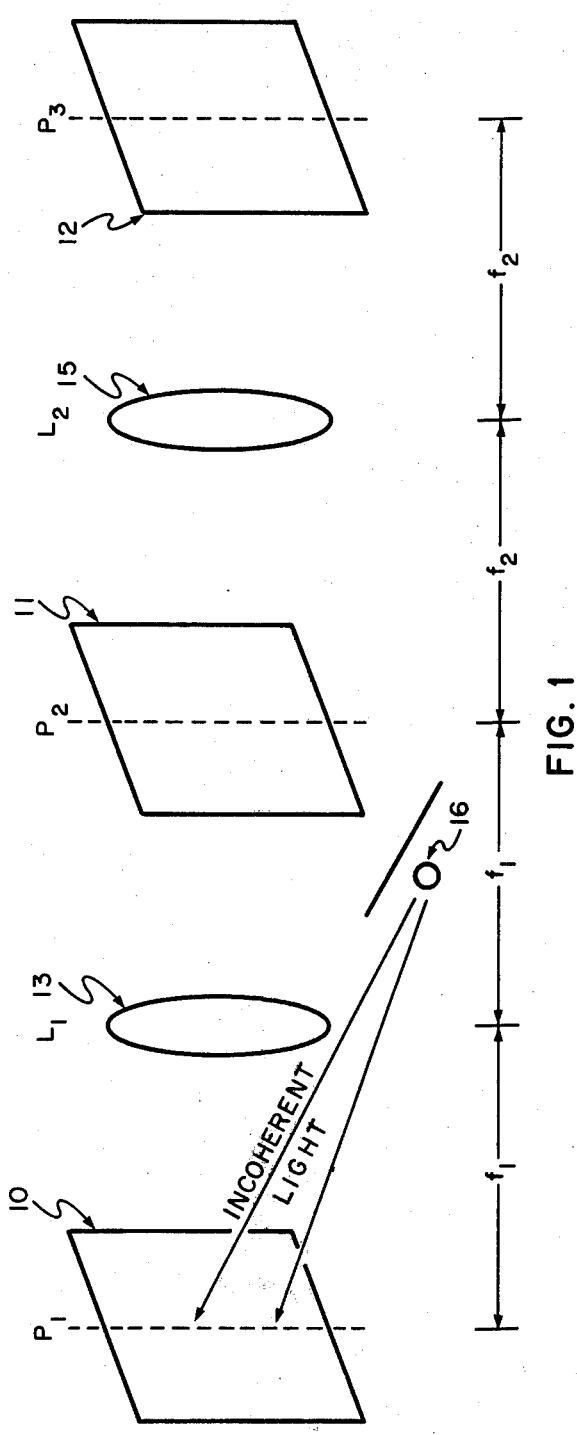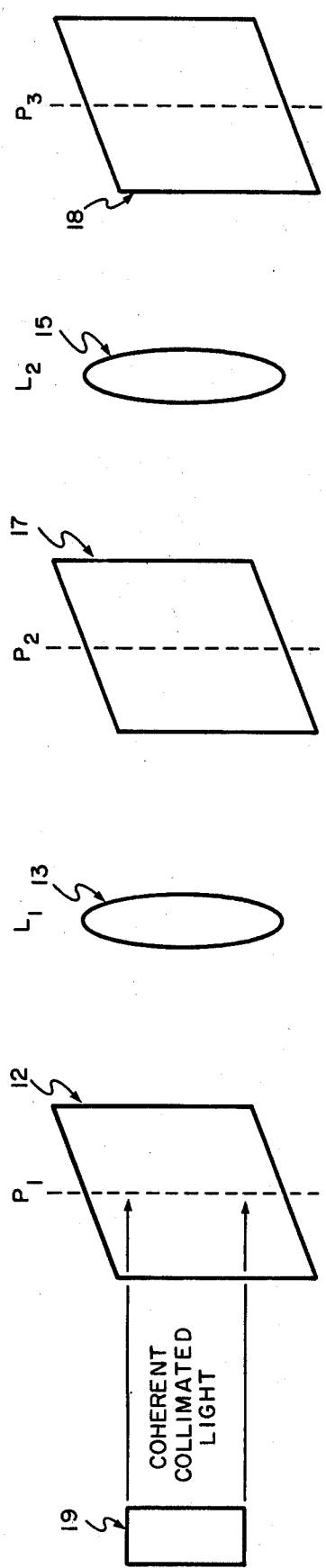
FIG. 1
FIG. 2
INVENTORS
KENNETH L. BERNSTEIN
PHILIP S. CONSIDINE
GEORGE B. PARRENT, JR.
BY,
ATTORNEYS

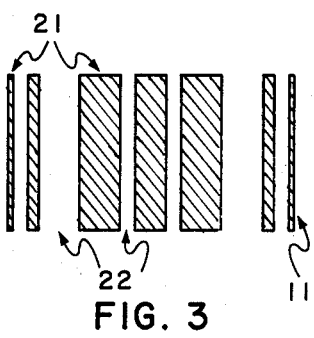
FIG. 3
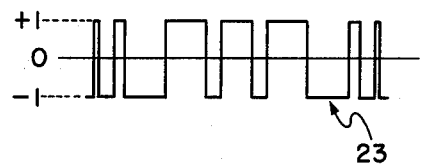
FIG. 3A
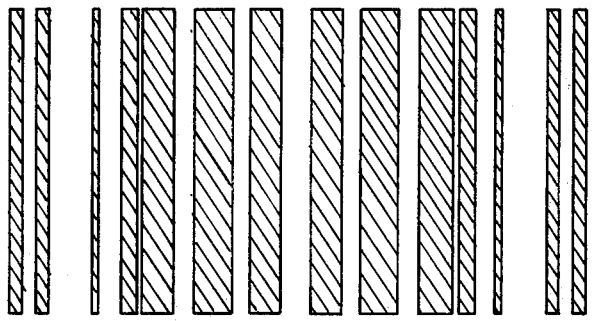
FIG. 5
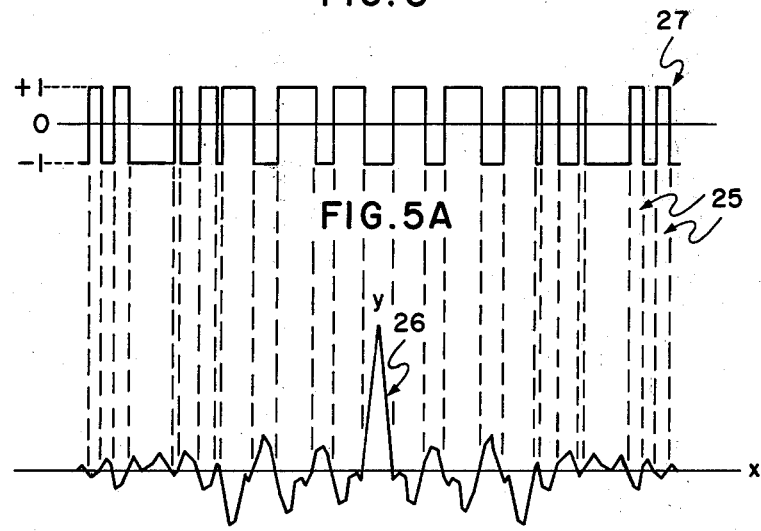
FIG. 5A
FIG. 4
INVENTORS
KENNETH L. BERNSTEIN
PHILIP S. CONSIDINE
GEORGE B. PARRENT, JR.
BY,
ATTORNEYS

PHOTOGRAPHIC IMAGING

According to the invention, an object, such as a signature in cursive script or a photograph of a person, is illuminated with incoherent light of narrow spectral width and its Fourier transform is formed in a plane in space. Arbitrarily selected portions of the Fourier transform are shifted in phase with respect to other portions according to a complex function having the property that the phase shift introduced at each point in the transform plane satisfies either:

$\Phi(x,y) = \Phi(-x, -y)$ or that each point in the transform plane introduces the same or a pi difference in phase shift with respect to any other point.

Where:

$\Phi =$ the phase shift introduced at each point and $x$ and $y =$ Cartesian coordinates of each point in the transform plane.

The phase-altered distribution in the transform plane is retransformed to produce an encoded image in another plane where it can be examined, recorded on photographic film, or the like.

According to a further feature of the invention, the recorded encoded image can be operated upon to obtain an image corresponding to the original object. In an optical system similar to that used for encoding a recorded encoded image, for example, a photographic transparency, is submitted for the original object, and is illuminated with collimated coherent quasi-monochromatic light and its Fourier transform is formed in a plane in space. Selected portions of this Fourier transform are shifted in phase with respect to other portions according to the autoconvolution of the complex function used in making the encoded image. The phase-altered distribution in the transform plane is retransformed to produce a decoded image in another plane where it can be examined, recorded on photographic film or the like.

The invention further contemplates the provision of novel pairs of phase-shift elements, having arbitrary phase-shift patterns distributed in a prescribed area according to the above-mentioned complex function which are useful, one of each pair for encoding and the other for decoding images. Such elements which may be in the form of phase plates having unique phase-shift patterns, may be used as keys or code elements, for encoding and decoding information in a given security system.

Further objects and features of the invention will become apparent from the following description of an exemplary system. This description refers to the accompanying drawings wherein:

FIG. 1 is a diagrammatic illustration of an encoding system.

FIG. 2 is a diagrammatic illustration of a decoding system.

FIG. 3 depicts an exemplary phase-shift element for encoding in accordance with the invention.

FIG. 3A is a graphical representation of the phase shift element of FIG. 3.

FIG. 4 depicts the autoconvolution of the function graphically represented in FIG. 3A.

FIG. 5 depicts a phase shift element for decoding an image encoded with the element of FIG. 3.

FIG. 5A is a graphical representation of the phase shift element of FIG. 5.

Referring to FIG. 1, object 10 is located at plane $P_1$ in the front focal plane of first lens means 13 of focal length $f_1$. Phase shift element 11 is located in the Fourier transform plane $P_2$, the back focal plane of lens means 13. Phase shift element 11 is also located in the front focal plane of second lens means 15 having a focal length $f_2$. Image receiving means 12 is located in the back focal plane $P_3$ of lens means 15. Plane $P_3$ may also be referred to as the retransform plane.

Light source 16 is depicted as illuminating an opaque object 10 for diffuse reflection through the optical system. With a transparent object the light source would be placed on the other side of the object and transmitted light would pass through the optical system. Light source 16 is an incoherent source such as a fluorescent lamp having a narrow spectral width. The spectral width is preferably no greater than 400 angstroms for most practical uses of the invention. As the spectral width increases beyond 400 angstroms the decoded images will become increasingly "noisy" and difficult to recognize. Narrower spectral widths will provide some improvement in the decoded images. Phase shift element 11 is adapted to introduce a shift in phase of the illuminating light that varies from point to point across its surface in accordance with a complex function satisfying the previously stated conditions either of symmetry as $\Phi(x,y) = \Phi(-x, -y)$ or if only pi phase shift differences between any one point and any point of different phase shift. Phase shift element 11 may be fabricated by photoresist or vacuum evaporation techniques well known in the art. For example, suitable vacuum evaporation techniques are described by J. Tsujiuchi in *Progress in Optics*, ed. Emil Wolf (New York, N.Y.: Interscience Publishers, 1963 ), II, 133–180. Image receiving means 12 is suitably a photosensitive medium such as photographic film for recording a coded image.

In operation, light from source 16 illuminates object 10. Light modified in accordance with the pattern of object 10 passes through lens 13 to give a Fourier transform of the object pattern in the transform plane $P_2$. Phase element 11 alters the phase distribution at the transform plane and the further transform operation performed by lens 15 yields an encoded image at retransform plane $P_3$. The encoded image is real and can be recorded photographically. It is, however, not a recognizable image of object 10 and for this reason no attempt has been made to illustrate any particular object and its encoded image.

Decoding of the encoded image is accomplished as shown in FIG. 2 which is similar to FIG. 1 except that the recording means 12, now carrying the encoded image, is positioned in the object plane $P_1$, phase element 11 has been supplemented by its auto-convolution in transform plane $P_2$ and collimated coherent quasi-monochromatic light is used for illumination. It will be understood that recording means 12 is commonly photographic film or the like which has been developed before use in accordance with FIG. 2. Operation is the same as in FIG. 1 except the image receiving means 18 which is now suitably a viewing screen although again it may be a recording medium, receives a decoded image recognizably similar to original object 10.

Coherent light source 19 may be a laser with a collimated beam. A mercury arc lamp has been successfully used having a 100 angstrom spectral width and using a 52 micron pinhole and a collimator with a 48 inch focal length to approximate coherency.

As previously stated the phase-shift element 11 can either follow a symmetric function, i.e. symmetrical with respect to an axis drawn through the center of and transverse to the optical path or it should have only pi phase-shift differences between any point and any other point of different phase shift.

For simplicity FIG. 3 illustrates an exemplary filter 11 as a line phase-shift element that is symmetrical. Further for simplicity cross-hatched areas 21 are all taken to produce a pi phase shift for the specific radiation used with respect to the areas 22 with no cross-hatch. Filter 11 of FIG. 3 is suitable for use as Filter 11 in FIG. 1.

FIGS. 3A, 4, 5 and 5A illustrate a method by which filter 17 of FIG. 2 can be determined from filter 11 of FIG. 1. First a graph is drawn with a curve 23 depicting the varations in filter 11. These variations are depicted graphically in FIG. 3A as going plus and minus "1" about a "0" axis in the manner of a square wave. Cross-hatched areas 21 of filter 11 having the additional phase shift are depicted graphically as +1 while areas 22 are depicted as −1.

The auto-convolution of the function depicted by the graph of FIG. 3A is illustrated in the graph of FIG. 4. It was determined mathematically that a filter providing a relative pi phase shift at every point where the auto-convolution in graph FIG. 4 went negative would decode an image coded by the filter of FIG. 3.

The graph similar to the graph of FIG. 3A but for the decoding filter is illustrated in FIG. 5A and the decoding filter 17 made from the graph is illustrated in FIG. 5.

Dashed lines 25 between FIGS. 4 and 5A show the correlation between the negative portions of auto-convolution curve 26 and the positive (pi phase shift) portions of curve 27 in FIG. 5A. Cross-hatched lines in FIG. 5 depict the pi phase shift in filter 17 correlated with the positive portions of curve 27 in FIG. 5A.

When the filter is more complex than the simple line in bar filter illustrated, the same principles apply, but utilization becomes more involved. Thus if a simple graph such as FIG. 3A applies to the encoding filter 11 at any horizontal line across the filter, then a single auto-convolution can be obtained and applied as described above. However, at any horizontal line across the encoding filter in which the graphical representation changes, a separate graph must be determined, its auto-convolution calculated and the respective portion of the decoding filter designed accordingly. Thus a whole sequence of graphs and their auto-convolution may be required to obtain one decoding filter.

It will be noted that the auto-convolution will always double the dimensions. If the aperture of the optical system is too small to permit this, the decoded image will suffer from distortions which will be inversely related to the system aperture.

While this problem can be overcome by using a decoding system with twice the aperture diameter as the encoding system. It is contemplated that the same optical system might be used for both encoding and decoding. In this case it is only necessary that the aperture of the single optical system be large enough so that a decoding filter twice the diameter of the encoding filter can fit within the aperture.

While the invention has been described in relation to specific embodiments thereof, it is not the intention to be limited thereby, but rather to cover the invention broadly within the spirit and scope of the appended claims.

What is claimed is:

1. An optical method of coding and decoding comprising:
    a. Illuminating an original object with incoherent light having a spectral width at least as narrow as 400 angstroms so that modulated light passes from said object;
    b. Phase-shifting said modulated light in a Fourier transform plane according to a complex function having the property that only pi phase-shift differences are introduced between points introducing different phase-shift or the phase-shift introduced conforms with the symmetric functions $\Phi(x,y) = \Phi(-x, -y)$ where:
    $\Phi$ = the phase-shift introduced at each point and
    $x$ and $y$ = Cartesian coordinates at each point
    c. Making a visible recording of an image of said object containing aberrations introduced by said phase-shifting in an image plane;
    d. Illuminating said recording with coherent collimated quasi-monochromatic light so that modulated light passes from said recording;
    e. Phase-shifting the modulated light passing from said recording in a Fourier transform plane according to a complex function derived from the auto-convolution of the function used in making said recording; and
    f. Intercepting an image of said recording in an image plane with said aberrations removed.

2. An optical method according to claim 1 in which the modulated light passing from said object is reflected light and said modulated light passing from said recording is transmitted light.

3. Apparatus for optical coding and decoding comprising:
    a. A first lens;
    b. Means to support an object in a object plane in the front focal plane of said first lens;
    c. A second lens;
    d. Means to support a filter in a transform plane in the back focal plane of said first lens and the front focal plane of said second lens;
    e. Means to support image receiving means in the back focal plane of said second lens; and
    f. An encoding filter conforming to a first complex function and a decoding filter conforming to a second complex function derived from the auto-convolution of said first complex function alternately positionable on said means to support a filter according to whether encoding or decoding is to be performed.

* * * * *